United States Patent [19]

Blonder et al.

[11] Patent Number: 5,101,457
[45] Date of Patent: Mar. 31, 1992

[54] OPTICAL FIBER WITH AN INTEGRAL LENS AT ITS END PORTION

[75] Inventors: Greg E. Blonder, Summit; Bertrand H. Johnson, Murray Hill, both of N.J.

[73] Assignee: AT&T Bell Laboratories, Murray Hill, N.J.

[21] Appl. No.: 486,630

[22] Filed: Feb. 28, 1990

[51] Int. Cl.$^5$ ............................................... G02B 6/32
[52] U.S. Cl. .......................................... 385/33; 385/93
[58] Field of Search ............... 350/96.15, 96.18, 96.29, 350/96.30, 96.19, 432, 437

[56] References Cited

U.S. PATENT DOCUMENTS

| | | | |
|---|---|---|---|
| 3,616,098 | 10/1971 | Falls | 161/1 |
| 3,883,353 | 5/1975 | Cohen et al. | 96/38.3 |
| 4,040,893 | 8/1977 | Ghezzo | 156/659 |
| 4,040,897 | 8/1977 | Blish et al. | 156/656 |
| 4,055,458 | 10/1977 | Niederprum | 156/663 |
| 4,118,270 | 10/1978 | Pan et al. | 156/659 |
| 4,159,863 | 7/1979 | Stewart | 350/96.18 |
| 4,229,197 | 10/1980 | Streng | 65/4 B |
| 4,265,699 | 5/1981 | Ladany | 156/657 |
| 4,406,732 | 9/1983 | Kayoun | 156/626 |
| 4,469,554 | 9/1984 | Turner | 156/657 |
| 4,490,020 | 12/1984 | Sakaguchi et al. | 350/96.18 |
| 4,564,417 | 1/1986 | Schoen et al. | 156/633 |
| 4,784,466 | 11/1988 | Khoe et al. | 350/96.33 |
| 4,785,462 | 11/1988 | Keil | 372/92 |
| 4,795,228 | 1/1989 | Schneider | 350/96.18 |
| 4,812,002 | 3/1989 | Kato et al. | 350/96.18 |
| 4,892,375 | 1/1990 | Chikuma et al. | 350/96.18 |
| 4,929,070 | 5/1990 | Yokota et al. | 350/432 |

OTHER PUBLICATIONS

L. Svaasand et al, "Splicing of Optical Fibres with a ...", 304-8 Procedures of 4th European Conf. on Optical Comm, Genoa 1978.
H. Sunak et al, "Lauching Light from Semiconductor Lasers ...", Applied Optics, vol. 22, No. 15, Aug. 1, 1983, pp. 2344-2348.
J. D. Crow et al, "Fabrication of Lenses on Tips of Fibers", No. 3 IBM Technical Disclosure Bulletin, 1977, pp. 1235-1236, vol. 20.
W. A. Pliskin et al, "Etches for the PSG-SiO$_2$ System", pp. 37-47 Proceedings of the Symp. on Etching for Pattern Definition.
M. Kawachi, "Microlens Formation on VAD Single-Mode Fibre Ends", Electronics Letters, Jan. 21, 1982, vol. 18, No. 2, pp. 71-72.
S. Hopland et al, "Fabrication of Coupling Fibres ...", Optical Comm. Conference, Amsterdam, 9/17-19/79, 9.3-1 to 9.3-4.
G. Khoe et al, "Progress in Monomode Optical Fiber ...", pp. 217-227 Journal of Lightwave Technology, vol. LT-2, No. 3, Jun. 1984.
P. Kayoun et al, "Improved Coupling Between Laser ...", pp. 400-402 Electronics Letters, Jun. 11, 1981, vol. 17, No. 12.
H. Ghafoori-Shiraz, "Experimental Investigation on Coupling ..." Optical and Quantum Electronics, 20 (1988) pp. 493-500.
G. Eisenstein et al, "Chemically Etched Conical Microlenses ...", Applied Optics, vol. 21, No. 19, Oct. 1, 1982, pp. 3470-3474.

Primary Examiner—Frank Gonzalez
Attorney, Agent, or Firm—Michael J. Urbano

[57] ABSTRACT

An optoelectronic assembly is described which comprises an optoelectronic device (e.g. laser, photodiode or another fiber), an end portion of an optical fiber coupled to the device, and an integral lens formed on the end portion. The lens comprises a frustum of a first cone having a cone angle $\theta_1$, and, on top of the frustum, a second cone having a cone angle $\theta_2 < \theta_1$, thus forming a double conical lens which requires no further operations (such as fire polishing) to provide coupling efficiencies of about 80% with a standard deviation of less than ±2%.

12 Claims, 5 Drawing Sheets

OPTICAL FIBER WITH AN INTEGRAL LENS AT ITS END PORTION

CROSS REFERENCE TO RELATED APPLICATIONS

This application was concurrently filed with application Ser. No. 07/486,350 (now allowed, but not issued) entitled "Matte Finishes on Optical Fibers and Other Glass Articles".

BACKGROUND OF THE INVENTION

1. Field of the Invention

The present invention relates to a technique for fabricating an optical fiber with a lensed endface and, more particularly, to a fiber lensing technique which utilizes wet chemical etching operations to form the desired shape of the lens.

2. Description of the Prior Art

In most optical communications systems, a lightwave signal must be coupled between an optical fiber and a device (e.g., a laser, LED photodiode, or another fiber). For most conventional arrangements, discrete lenses in bulk form are inserted in the light path in front of the fiber to couple the signal into or out of the core region of the fiber. Problems exist with these arrangements with respect to alignment of components, the size of the bulk optic components, signal loss, overall cost, etc. A partial solution has been developed in which a discrete lens element is attached (e.g., epoxied) directly to the endface of the fiber. This approach may reduce signal loss and the overall complexity of the arrangement. However, the operation involved in attaching the lens to the fiber is time-consuming and may unnecessarily increase cost. Further, over extended periods of time the adhesive may fail, and the lens may become misaligned or completely detach itself from the fiber.

One alternative to the epoxied lens technique rests upon the recognition that differently doped glass materials used to form fibers etch at different rates when exposed to common fluorine-based etchants such as hydrofluoric acid and buffered hydrofluoric acid. By controlling various etching parameters (e.g., strength, time, temperature), workers have discovered that, for example, the cladding can be preferentially etched (removed) with respect to the core, leaving an exposed, protuberance. According to P. Kayoun et al, *Electronic Letters*, 17(12), 400(1981), such a "protuberance acts as a diffracting phase object with lens-like properties." (p.401, col. 1). The lens, however, had a depression in the center and exhibited a coupling efficiency of only 35%. See also P. Kayoun, U.S. Pat. No. 4,406,732. In both references 40% concentration of hydrofluoric acid was used to form the lens on MCVD single mode fibers having pure silica cores and boron-doped claddings. Kawachi et al, *Electronic Letters*, 18(2), 71(1982) recognized that the depression prevented one from obtaining high quality microlenses. They described the use buffered hydrofluoric acid to produce a mesa or "circular cone" (FIG. 1) on the end of a VAD single mode fiber having a Ge-doped core and a pure silica cladding. Fire polishing converted the mesa or cone into a "round-shaped" microlens (p.71, col.2), but no evidence of coupling efficiency or reproducibility was reported.

Etching/polishing techniques, such as those described above, naturally align the lens with the core, regardless of any deviation in core placement within the fiber. Moreover, the shape of the lens immediately after etching is not very important because, regardless of that shape, surface tension effects during subsequent fire polishing convert that shape into a sphere.

Although this chemical etching method of forming a fiber lens is a viable alternative, some problems remain, including its relatively low coupling efficiency ($\eta$ of approximately 40–50%) and the need to carefully control the fire-polishing operation. In addition, fire polishing is frequently incompatible with other aspects of the process (e.g., the presence of plastic coating or epoxy on the fiber; or the availability of only a short stub of fiber on which to operate).

More recently, H. Ghafoari-Sheraz, *Optical and Quantum Electronics*, 20,493 (1988) used buffered hydrofluoric acid to construct a conical microlens on the end of an aluminum-coated VAD single mode fiber having a Ge-doped core and a pure silica cladding. A minimum coupling loss of about 3 dB was reported, which corresponds to a coupling efficiency of less than 50%. Although the author did not use fire polishing in these experiments, he explicitly allows for that possibility to form a round-shaped microlens.

Thus, a need remains in the prior art for a lensing technique which does not include critical manufacturing operations, does not require fire polishing, and is capable of reproducibly achieving coupling efficiencies greater than 50%.

SUMMARY OF THE INVENTION

The need remaining in the prior art is addressed by one aspect of the present invention, a technique for fabricating an optical fiber with a lensed endface and, more particularly, a fiber lensing technique which utilizes wet chemical etching operations to form the desired curvature of the lens. Other aspects of the invention include the ability to produce different desired lens shapes depending on the parameters of the etching step and the doping profile of the fiber; the ability to do end point detection by measuring the outside diameter of the fiber; and the ability to metalize the fiber by an electroplating operation.

In general, the invention includes providing an optical fiber which has first and second portions which etch at first and second rates when exposed to an etchant, characterized by exposing those portions to a treating agent, simultaneously with the etchant, which modifies at least one of the etch rates relative to the other. The portions may be any two zones of the fiber endface such as, for example, the core and cladding. Illustratively, the treating agent is an acid (e.g., an acetate-based acid or a citrate-based acid) which, by itself, does not significantly etch the fiber. An attractive feature of the invention is that the combination of the etchant and the treating agent provides an additional degree of freedom which allows lenses to be shaped from a variety of fibers of different compositions.

The ability to shape such lenses is particularly important in the fabrication of a lens on a fiber which has a nonuniformly doped core, a common, albeit inadvertent, artifact of the predominant fiber fabrication processes (CVD and MCVD). As noted earlier, a lens formed on the end of such a fiber may have a generally conical shape but, undesirably, the apex of the cone is obliterated by a cusp or depression (FIG. 1) which forms there because the center portion of the core etches too fast relative to the peripheral portion. In accordance with one embodiment of the invention, the etch rate of the center portion is reduced by exposing the fiber to a treating agent, simultaneously with the etchant, which alters the etch rate of the center portion relative to the peripheral portion.

In exemplary embodiments the etchant comprises a fluorine-based etchant (e.g., buffered hydrofluoric acid) and the treating agent comprises an acid (e.g., acetic acid or citric acid). On single mode fibers this etching technique advantageously produces a unique integral lens shape comprising a frustum of a first cone having a cone angle $\theta_1$, and, on top of the frustum, a second cone having a cone angle $\theta_2 < \theta_1$. This lens shape has led to average coupling efficiencies of about 80%, and the inventive process has realized extremely narrow statistical distributions (i.e., standard deviation of less than ±2%) of the coupling efficiency. These characteristics, together with considerable flexibility in the choice of etching parameters (e.g., time, temperature, concentration), all point to a process with a high degree of manufacturability.

Although the term cone implies a triangular cross section, in practice the sides of the cone may be slightly curved (convex or concave) if so desired. Such curvature may be useful in reducing reflections or enhancing coupling efficiency.

The unique lens shape discussed above gives rise to another aspect of the invention, an optoelectronic assembly comprising an optoelectronic device (e.g., laser, photodiode or another fiber), an end portion of an optical fiber coupled to the device, and an integral lens formed on the end portion, characterized in that the lens comprises a frustum of a first cone having cone angle $\theta_1$, and, on top of the frustum, a second cone having a cone angle $\theta_2 < \theta_1$.

Yet another aspect of the invention from a manufacturing standpoint arises from our recognition that the end point of the etching process need not be monitored by measuring time, nor by observing the lens shape directly (since it is very small, and even small errors in judgment may lead to large deviations in lens shape). Rather, we have found that the endpoint can be determined by monitoring the much larger outside diameter (OD) of the fiber. When the OD, which gradually decreases during the etching process, reaches a predetermined dimension, the etching is terminated and the desired lens shape is attained.

One other embodiment relates to forming a metal layer on a lensed fiber using the technique described in our concurrently filed application, supra. More specifically, a matte finish is formed on the outer surface of the fiber by exposing it to a mixture of the etchant and a relatively high concentration of a treating agent. The fiber is then electroplated with metal, the matte finish being effective to ensure proper adhesion. Then the end of the fiber may be lensed as described previously. This plating procedure is much simpler and less costly than the prior art which utilizes sputtering, or firing a metal ceramic onto the fiber, to deposit the metal. In addition, electroplating produces more uniform layers than presently practiced sputtering techniques.

BRIEF DESCRIPTION OF THE DRAWING

The invention, together with its various features and advantages, can be readily understood from the following more detailed description taken in conjunction with accompanying drawing, in which.

DETAILED DESCRIPTION

Figure 1:
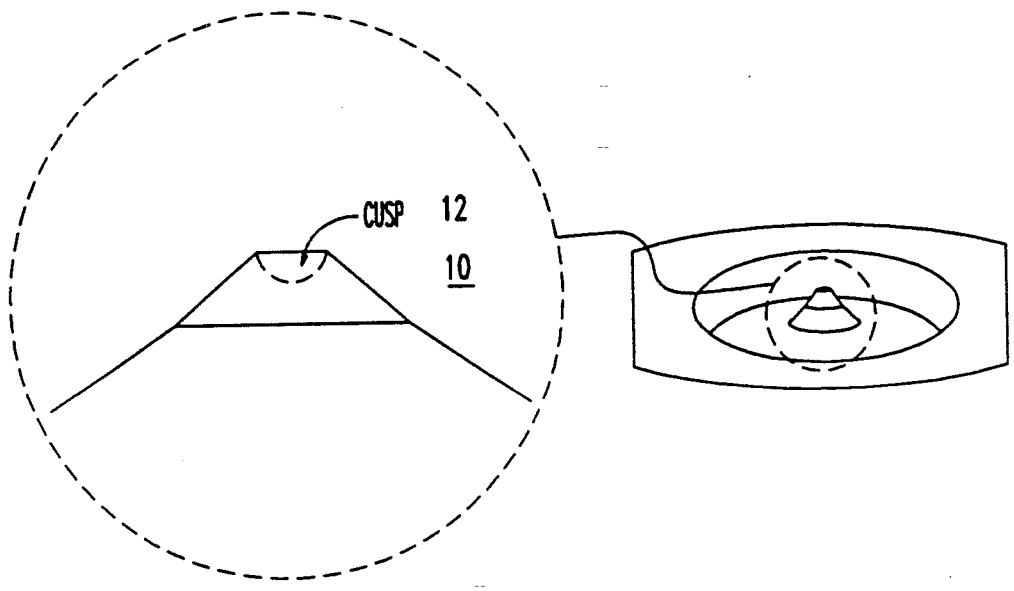
FIG. 1 is a sketch illustrating a prior art etched fiber lens having a cusp or depression in the center.

It has been discovered that problems in coupling efficiency in many conventional etched fiber lenses can, in part, be attributed to a cusp, or depression, which forms in the extreme central portion of the core. FIG. 1 is a sketch of the end of a single mode fiber illustrating the etched depression 12 formed on the tip of lens 10. When optical fiber preforms are formed by collapsing a tube, the central region of the preform has been found to have a much lower concentration of dopants (i.e., the central region consists of essentially undoped silica glass). The drawn fibers will then have the same characteristics. When this type of fiber is exposed to a conventional buffered oxide etchant (BOE) to form a lens, the undoped silica material in the extreme central portion of the core etches at a much faster rate than the peripheral doped region of the core. This differential etch rate results in the formation of the depression in the central portion of the core (where the lens is formed) which in turn leads to relatively low coupling efficiencies (typically less than about 50%).

Our investigation into this problem indicates that a generalized solution includes adding a treating agent to the etchant in order to reduce the etch rate of the central portion of the core relative to the peripheral portion. We believe that the treating agent may bind preferentially to the central portion, thus, to at least some extent, masking it from the etchant and slowing down its etch rate. Suitable treating agents include acids (e.g., acetic or citric) which, by themselves, do not significantly etch the fiber. As mentioned previously, the presence of the treating agent provides an additional degree of freedom which allows lenses to be sculpted from a variety of fibers of different compositions.

EXAMPLE I

This example describes the formation of a lens on an end portion of an optical fiber using a mixture of BOE and acetic acid.

The fiber itself was a standard, step-index, depressed cladding MCVD single mode silica fiber having an 8 $\mu$m core and a 125 $\mu$m outside diameter (OD). The core was doped with Ge such that the center core region had a much lower dopant concentration than the peripheral core region. The cladding included an inner cladding layer doped with P and F and an essentially undoped outer cladding layer.

Figure 2:
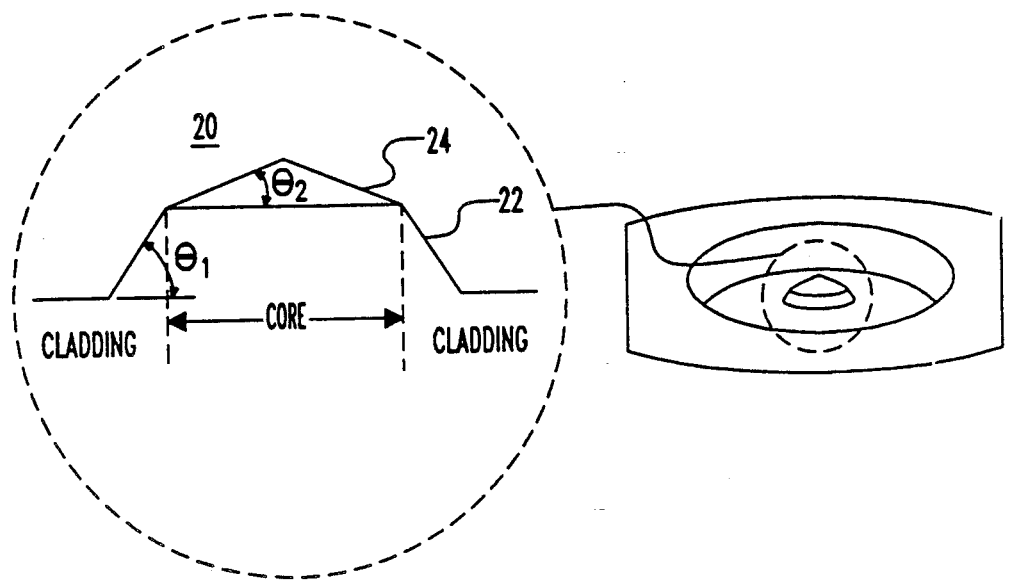
FIG. 2 is a sketch illustrating an etched lens formed in accordance with one embodiment of the present invention.

The end of the fiber was cleaved flat and dipped in a mixture containing equal parts by volume of (3:1 BOE) and 99% acetic acid at 20° C. for 80 minutes. The BOE contained 1 part 49% HF to 3 parts 40% NH$_4$F by volume. As a consequence, no depression or cusp was formed. Instead, the etching process produced a unique lens 20 having a double conical shape as shown by the sketch of FIG. 2. The lens 20 comprised a frustum 22 of a first cone having a cone angle $\theta_1$, and, disposed on top of the frustum, a second cone 24 having a cone angle $\theta_2 < \theta_1$. (e.g., $\theta_1 = 50°$ and $\theta_2 = 20°$). As shown, the base of the first cone is coextensive with the top of the frustum, although this is not essential.

It is expected that other BOE compositions (e.g., 3:1 to 7:1) may produce comparable results, although they might require different mixture temperatures and/or treating agent concentrations.

Light at 1.3 μm from a well-known covered mesa buried heterostructure (CMBH) InP/InGaAsP laser emitting about 2600–2700 μW of optical power was coupled into the fiber via the lens. This lens exhibited an average coupling efficiency of about 78%, with a standard deviation of less than ±2%, without the need for any further lens shaping operations, such as the fire polishing operation of the prior art. These aspects of the invention are especially important in a manufacturing environment where one goal is to provide a product of consistent quality and high yield.

Figure 3:
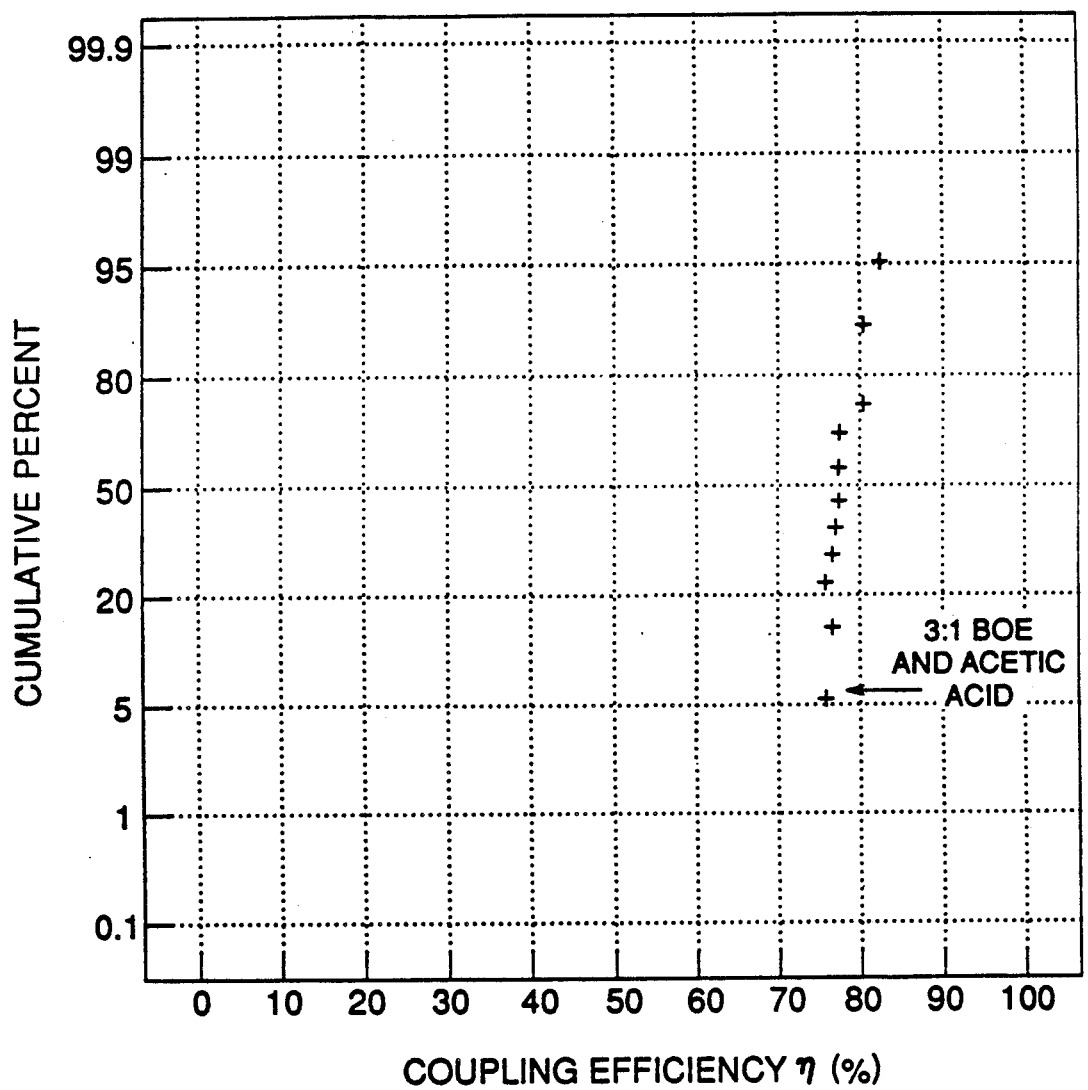
FIG. 3 is a graph illustrating a normal probability plot of coupling efficiency of lensed fibers formed in accordance with one embodiment of the present invention using a mixture of 3:1 BOE and acetic acid.

More specifically, FIG. 3 is a normal probability plot of the coupling efficiency $\eta$ for a statistically large number of lensed fibers formed in accordance with this example. The data show that the lensed fibers of the present invention have, in general, a high coupling efficiency (average—78%) and tight statistical distribution. Subsequent experiments repeating our prescription have yielded an even higher average coupling efficiency of about 80% and a similar standard deviation.

EXAMPLE II

Figure 4:
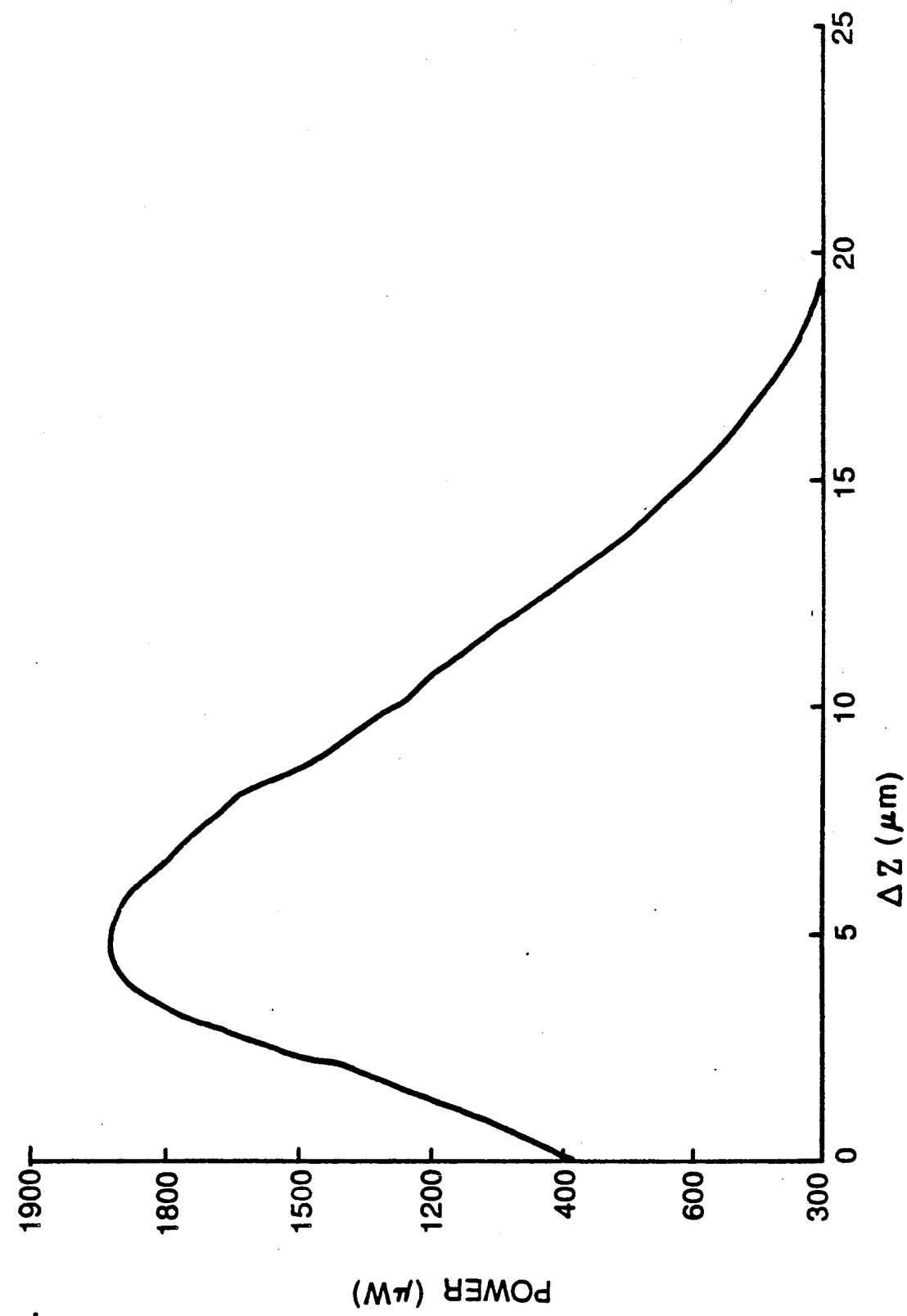
FIG. 4 is a graph illustrating coupled power as a function of the change in separation ($\Delta z$) between the source and a lensed fiber fabricated in accordance with the embodiment of the invention described in conjunction with FIG. 3.

Using a fiber and etchant mixture as described in Example I, the etching time at 20° C. was varied from 70 to 85 minutes for a plurality of fibers. For each lensed fiber a curve of the type shown in FIG. 4 was plotted to determine the variation in coupling efficiency to a CMBH semiconductor laser, as described above, as a function of the change in axial distance $\Delta z$ between the laser and the fiber lens. Although the coupled power data of all of the lensed fibers was taken for etching times of 70–85 minutes, suitable etching times range from 15 to 150 minutes, depending on the specific etchant composition used.

The data showed that a maximum coupling efficiency of about 65% to 80% occurred for $\Delta z$ of about 4 to 8 μm, depending on the particular lensed fiber used in the measurements.

EXAMPLE III

Using a fiber as described in Example I and a BOE ratio of 3:1, the volume percent of 99% acetic acid at 20° C. was varied from 40% to 75%. We found that approximately 40 to 55% acetic acid produced acceptable lenses, but above about 55% the glass fiber began to exhibit a matte finish.

EXAMPLE IV

Figure 5:
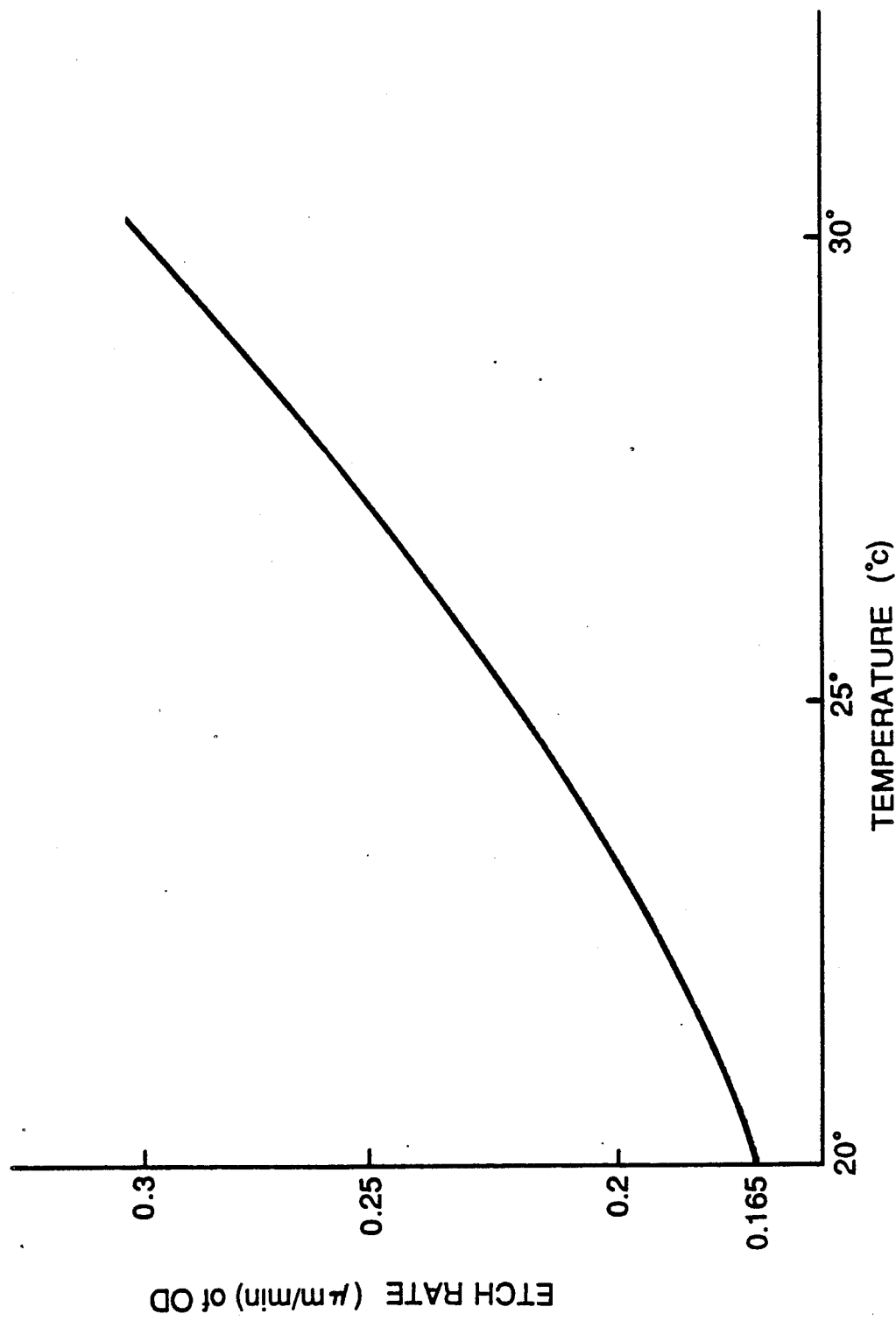
FIG. 5 is a graph illustrating how the etch rate of the fiber outside diameter (OD) changes with temperature.

Using the fiber and etchant mixture as described in Example I, the temperature was increased over the range of 20° to 30° C., whereas the corresponding etching time was decreased over the range of 150 to 15 minutes. Higher temperatures generally correspond to shorter times. As shown in FIG. 5, the etch rate of the fiber OD varied from about 0.165 μm/min. to 0.3 μm/min. In addition, $\eta_{max}$ decreased with increasing temperature from 75% at 20° C. to 72% at 25° C. to 68% at 30° C., yet $\eta_{max}$ occured at nearly the same OD (e.g., 102 μm±1 μm) despite the fact that the etch rate doubled with only a 10° C. change in temperature. This data demonstrates the stability of our process; the fiber OD is a reliable predictor of a desired lens shape or, equivalently, that maximum coupling efficiency has been achieved.

EXAMPLE V

Using the fiber as described in Example I, citric acid was substituted for acetic acid under the following conditions: a 100 ml solution was prepared from 50 g of citric acid crystals and 100 ml water. This solution was added to 3:1 BOE to make a mixture of 50% citric acid and 50% 3:1 BOE. Experiments as described above at 20° C. for 70 minutes demonstrated that lensed fibers made this way had similar lens shapes and a slightly higher average coupling efficiency (about 82%) with a comparable standard deviation. The citric acid is so mild (low vapor pressure above the liquid) that it has the added advantage of not attacking the portion of the fiber or etching apparatus which is exposed above the surface of the etching bath.

EXAMPLE VI

Following the procedures of Example V, similar results were obtained for different amounts of citric acid and different etching times; e.g., 125 g of citric acid and an etching time of 56 minutes, and 75 g of citric acid and an etching time of 60 minutes. In general, citric acid as a treating agent was found to be very attractive because 80% coupling efficiencies were obtained with a variety of different types of fiber.

Another aspect of the invention relates to hermetic packaging in which a metalized fiber is inserted through an opening in a metal package and sealed thereto with solder. In particular, a matte finish is formed on the outer surface of the fiber by exposing it to a mixture of 3:1 BOE and acetic acid in which the concentration of acetic acid is relatively high as described in Example III above and in our concurrently filed application, supra. The textured fiber is inserted into a standard electroplating bath in order to deposit metal layers such as Ni and Au. A lens may then be formed on the end of the fiber as previously described. The metal layers may be used, for example, to form a hermetic seal by soldering.

Figure 6:
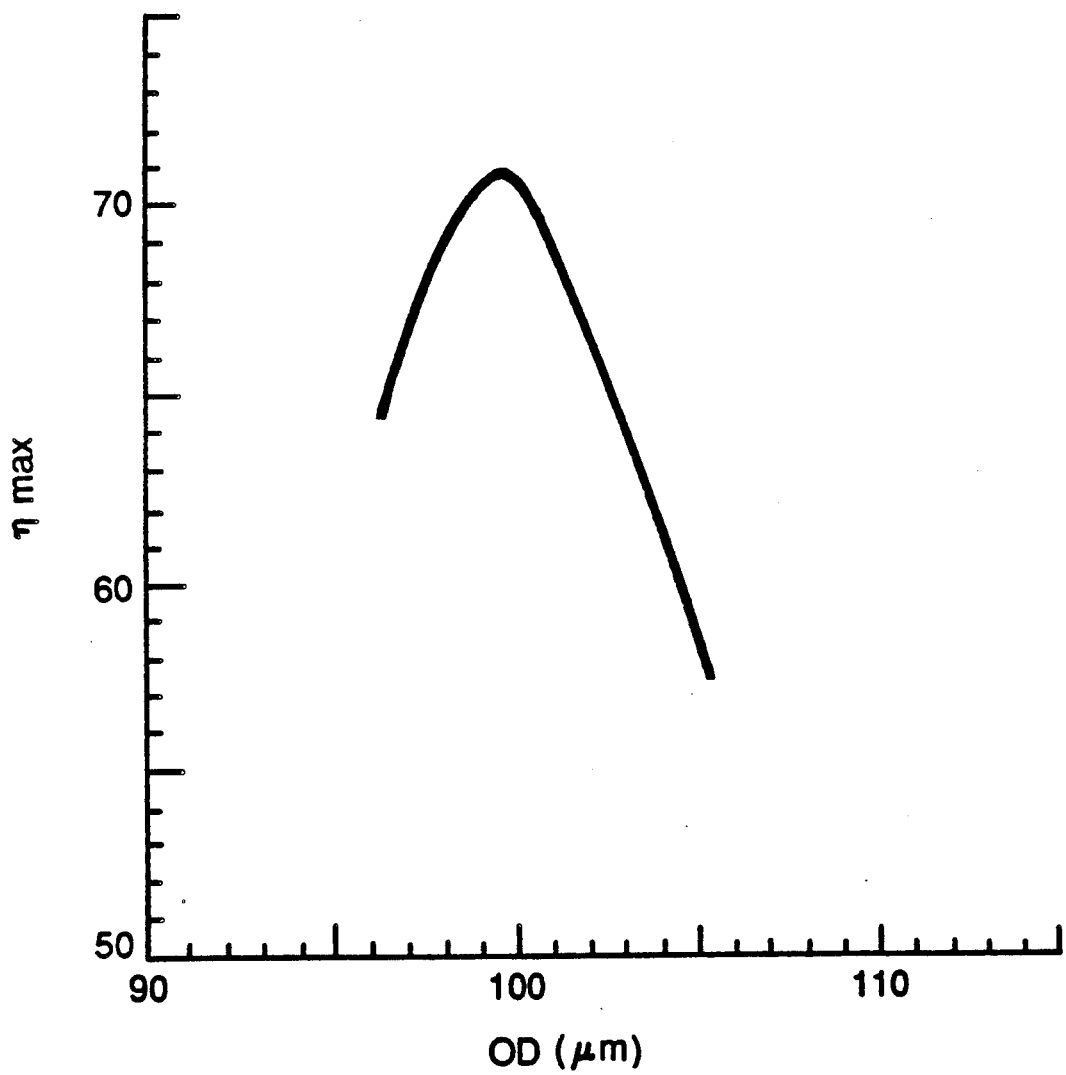
FIG. 6 is a graph illustrating how the maximum coupling efficiency $\eta_{max}$ changes as the fiber OD decreases during the etching process; this graph, therefore, correlates $\eta_{max}$ and etching time.

One more aspect of the invention relates to end-point detection of the lens etching procedure. Given that the lens itself has dimensions on the order of the size of the core (e.g., <10 μm for single mode fibers), it would be extremely unreliable to measure the lens size directly—small errors in measurement would be large percent errors relative to the small lens size. Instead, because the outer surface of the fiber is being etched simultaneously with the end face (FIG. 6), the fiber OD may be empirically correlated to the desired lens shape. This correlation identifies a predetermined OD corresponding to the desired lens shape. Thus, etching is stopped when the predetermined OD is reached. Since the particular OD (e.g., 100 μm) is much larger than the lens (e.g., 8 μm), this procedure is much more tolerant to errors in measurement.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, although the preceding discussion emphasized lens formation on conventional single mode fiber, it may also be applicable to multi-mode fiber, dispersion-shifted fiber, or polarization-preserving fiber. In addition, it is well known in the art that a trade off exists between coupling efficiency and alignment tolerance; that is, a higher coupling efficiency generally requires tighter alignment (smaller tolerance) and conversely. Tighter alignment, of course, implies packages designed to provide a higher degree of mechanical stability, especially where environmental conditions (e.g., temperature changes) are a problem. Because such packages may be more difficult to manufacture reproducibly, it may be desirable, in some cases, to sacrifice some degree of coupling efficiency in exchange for ease of alignment and manufacture. The invention is particularly well suited to such trade offs because the lens shape can be adjusted to give any predetermined number within a relatively broad range of coupling efficiencies (e.g., 65-80%) all of which are higher than the prior art (e.g., 40-50%). Thus, the invention allows the designer to choose a relatively high coupling efficiency yet design a package with acceptable tolerances. This advantage is further enhanced by the fact that the invention produces lensed fibers having tight statistical distributions regardless of the particular coupling efficiency chosen.

We claim:

1. An optoelectronic package comprising
   an optoelectronic device,
   an optical fiber having an end portion coupled to said device,
   said end portion including an integral lens, characterized in that
   said lens comprises a frustum of a first cone having a cone angle $\theta_1$ and, on top of said frustum, a second cone having a cone angle $\theta_2 < \theta_1$.

2. The package of claim 1 wherein the base of said second cone is essentially co-extensive with the top of said frustum.

3. The package of claim 1 wherein
   the core of said fiber has a central portion and a peripheral portion, the central portion being more lowly doped than the peripheral portion.

4. The package of claim 3 wherein said fiber is a single mode fiber.

5. The package of claim 3 wherein said fiber is a dispersion shifted fiber.

6. The package of claim 3 wherein said fiber is a polarization-preserving fiber.

7. An optical fiber having an end portion,
   said end portion including an integral lens, characterized in that
   said lens comprises a frustum of a first cone having a cone angle $\theta_1$ and, on top of said frustum, a second cone having a cone angle $\theta_2 < \theta_1$.

8. The fiber of claim 7 wherein the base of said second cone is essentially co-extensive with the top of said frustum.

9. The fiber of claim 7 wherein
   the core of said fiber has a central portion and a peripheral portion, the central portion being more lowly doped than the peripheral portion.

10. The fiber of claim 9 wherein said fiber is a single mode fiber.

11. The fiber of claim 9 wherein said fiber is a dispersion shifted fiber.

12. The fiber of claim 9 wherein said fiber is a polarization-preserving fiber.

* * * * *